Patented Sept. 30, 1924.

1,510,179

UNITED STATES PATENT OFFICE.

FRANS GEORG LILJENROTH, OF STOCKSUND, SWEDEN.

METHOD OF PRODUCING PHOSPHORUS NITRIDE.

No Drawing.   Application filed August 7, 1922.   Serial No. 580,290.

*To all whom it may concern:*

Be it known that I, FRANS GEORG LILJENROTH, a citizen of the Kingdom of Sweden, residing at Stocksund, Sweden, have invented new and useful Improved Methods of Producing Phosphorus Nitride, of which the following is a specification.

This invention relates to an improved method of producing phosphorus nitride in such manner and to such low cost that it may be used as a raw material for producing ammonia and phosphoric acid or ammonium phosphate.

The invention consists, chiefly, in that nitrogen is brought to react directly with phosphorus at an elevated pressure of at least 50 atmospheres and at an elevated temperature of at least 500° C.

For performing the reaction as rapidly as possible the temperature should be chosen as high as possible but on the other hand it is of importance to work somewhat below the temperature of dissociation of the phosphorus nitride at the pressure used. At or near to said temperature the speed of the reaction decreases to zero and if said temperature is exceeded the phosphorus nitride is again decomposed in its constitutents. The temperature of dissociation for the phosphorus nitride which at atmospheric pressure is about 500° C. raises if the pressure is increased. At a pressure of 10 atmospheres it is about 600° C., at 100 atmospheres about 700° C., and at 1000 atmospheres about 900° C.

The reaction is preferably performed with a gas mixture containing about 3 parts by volume of phosphorus and 10 parts by volume of nitrogen, though it is possible considerably to depart from this proportion without considerably lowering the temperature of dissociation or the speed of reaction.

The forming of phosphorus nitride from its elements is a strongly exothermic reaction. The heat developed by said reaction is so great that it corresponds to a rise of temperature of the phosphorus nitride of about 2000° C. If it is supposed that phosphorus nitride is actually formed from its elements at an elevated temperature which is lower than the temperature of decomposition, the heat developed by such reaction would immediately increase the temperature far above the temperature of dissociation and the phosphorus nitride formed would accordingly again be decomposed in its elements. For preventing such decomposition and actually obtaining phosphorus nitride, care must be taken of that the temperature always remains below the temperature of dissociation. This may be attained either by removing the heat of reaction as it is developed, for instance by cooling the reaction chamber or the phosphorus nitride and the gas mixture by water or by increasing the pressure by means of the reaction heat, thus increasing correspondingly the temperature of dissociation. In the former case the reaction is, preferably, performed continuously and at a constant pressure, in the latter case the reaction is, preferably, performed periodically in a closed receptacle at constant volume but at variable pressure.

The continuous method is, preferably, carried out in such manner that a mixture of phosphorus gas and nitrogen in the proportion 3:10 at an elevated temperature which, preferably, is equal to or somewhat higher than the temperature of dissociation of the phosphorus nitride, is supplied under pressure of for instance 1000 atmospheres to a reaction chamber wherein the gas mixture comes in contact with a preferably water-cooled and rotating surface. At a pressure of 1000 atmospheres the temperature of the gas mixture supplied to the re-action chamber should preferably be about 900° C. or preferably, somewhat higher.

The temperature of the mixture is lowered by the contact with the cooled surface below the temperature of dissociation to for instance 850° C. at which temperature the phosphorus nitride is rapidly formed. The heat developed by the forming of the phosphorus nitride is carried away as completely as possible by the cooled surface. The phosphorus nitride formed deposits as a pulverous mass on the cooled surface and if said surface is made rotatable the mass may be removed by a scraper in contact with said surface.

It is not necessary to transform the whole quantity of gas mixture supplied into phosphorus nitride as it may be suitable to pass a part of the gas unaltered through the reaction chamber. This may be effected for instance by an incomplete cooling so that the temperature of the gas mixture by the reaction heat is successively raised to the temperature of dissociation, or by using one of the elements, preferably the nitrogen, in excess. The surplus of gases flowing off from the reaction chamber is then mixed with a fresh gas mixture and again supplied to the reaction chamber.

By using such circulation of the gas mixture no external supply of heat is needed for preheating the fresh gas mixture as the latter is heated by being mixed with the gas flowing off from the reaction chamber. The gas mixture may preferably be produced by direct evaporation of phosphorus in an atmosphere of nitrogen of the working pressure, the phosphorus being supplied in solid or in molten state periodically or continuously. The melting, evaporating and heating of the phosphorus is preferably effected by heating beforehand the fresh nitrogen.

For protecting the reaction vessel against the action of the phosphorus and the high temperature it is preferably carried out with double walls and with cooling by water. The inner wall is provided with heat insulation and the cold nitrogen gas is led through the space between the walls ere it is supplied into the reaction chamber.

When carrying out the invention periodically, phosphorus, preferably in solid state, is placed in an autoclave which is then filled with nitrogen gas of a suitable pressure for instance 500 atmospheres and of a suitable temperature, for instance ordinary room temperature. The supply of nitrogen is then cut off and the gas included in the autoclave is heated, for instance by means of an electric heating element placed in the autoclave until the phosphorus evaporates and the phosphorus gas and the nitrogen begins to react with each other. By said reaction heat is evolved which raises the temperature and accordingly also the pressure and finally the reaction takes place rapidly. Finally the pressure reaches a maximum, of about 1000 atmospheres or higher and a temperature of about 900° C. or more. As the reaction mixture is transformed into phosphorus nitride the pressure and the heat evolved decreases and the temperature then begins to sink. The reaction is then ended, the greater part of gas mixture having been transformed into phosphorus nitride. When the temperature and the pressure has decreased sufficiently which may be speeded by cooling the autoclave, a fresh load of phosphorus is supplied to the autoclave. Nitrogen of high pressure is again supplied to the autoclave and the procedure is repeated. The phosphorus nitride formed may be removed from the autoclave after each operation or after a number of operations. The gas mixture which flows off from the autoclave when removing the phosphorus nitride, may again be used eventually after separation of its constituents by condensing the phosphorus vapors.

The invention is not limited to the use of pure nitrogen and pure phosphorus but it covers also such modifications that for pure nitrogen a gas mixture containing nitrogen is substituted and that for pure phosphorus or phosphorus gas phosphorus or phosphorus gas which is mixed with other substances, is used.

Having now described my invention I declare that what I claim is:—

1. The method of producing phosphorus nitride from its elements, which consists in bringing nitrogen and phosphorus to react directly with each other at an elevated pressure and at an elevated temperature which is lower than the temperature of dissociation of phosphorus nitride at the pressure used.

2. The method of producing phosphorus nitride from its elements, which consists in bringing nitrogen and phosphorus to re-act continuously and directly with each other at a substantially constant elevated pressure, and removing the chief part of the heat evolved.

3. The method of producing phosphorus nitride from its elements, which consists in heating phosphorus and nitrogen at an elevated pressure to a temperature which is at least equal to the temperature of dissociation of phosphorus nitride at the working pressure, and leading a mixture of said heated elements into contact with a cooled surface so that phosphorus nitride is formed and deposits on said surface.

4. The method of producing phosphorus nitride from its elements, which consists in bringing nitrogen and phosphorus to re-act with each other at an elevated pressure and at an elevated temperature, and preheating the fresh re-action mixture by means of the heat evolved in the re-action.

5. The method of producing phosphorus nitride from its elements, which comprises evaporating phosphorus in an atmosphere of nitrogen at an elevated pressure, and bringing the nitrogen and phosphorus to re-act directly with each other at a temperature which is lower than the temperature of dissociation of phosphorus nitride at the pressure used.

6. The method of producing phosphorus nitride from its elements, which comprises evaporating phosphorus in an atmosphere of hot nitrogen gas at an elevated pressure by means of heat derived from said nitrogen gas, and bringing the nitrogen and the phosphorus to re-action with each other at a temperature which is lower than the temperature of dissociation of the phosphorus nitride at the pressure used.

In testimony whereof I have signed my name.

FRANS GEORG LILJENROTH.